UNITED STATES PATENT OFFICE.

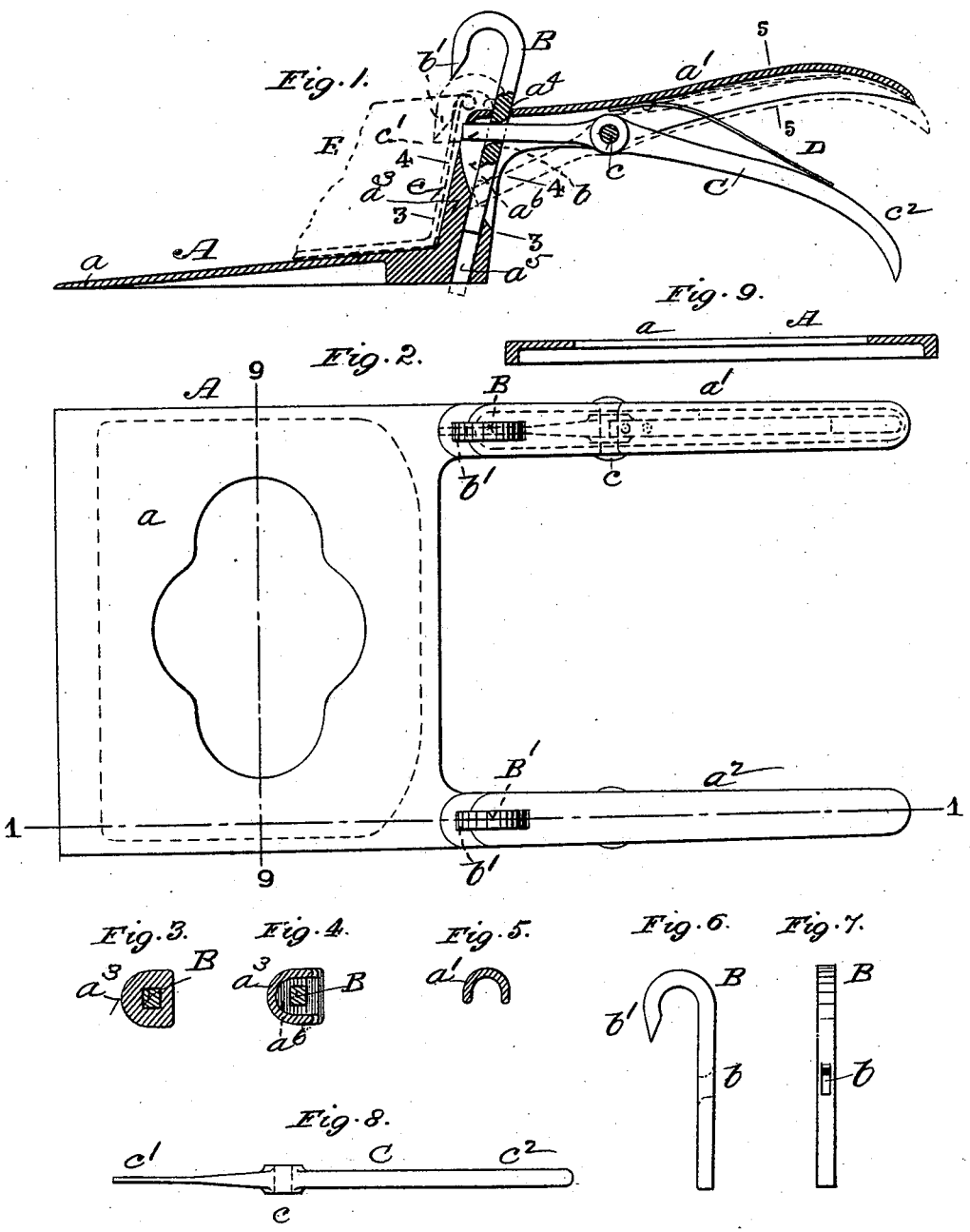

WILLIAM REISSE, OF ST. LOUIS, MISSOURI.

PAN-LIFTER.

SPECIFICATION forming part of Letters Patent No. 519,549, dated May 8, 1894.

Application filed January 8, 1894. Serial No. 496,168. (No model.)

*To all whom it may concern:*

Be it known that I, WILLIAM REISSE, of St. Louis, Missouri, have made a new and useful Improvement in Pan-Lifters, of which the following is a full, clear, and exact description.

The improvement relates more especially to the means for obtaining a hold upon the rim or the upper part of the side of the pan, substantially as is hereinafter set forth and claimed, aided by the annexed drawings, making part of this specification, in which—

Figure 1 is a vertical longitudinal section on the line 1—1 of Fig. 2, which, in turn, is a plan of the improved lifter; Fig. 3 a section on the line 3—3 of Fig. 1; Fig. 4 a section on the line 4—4 of Fig. 1; Fig. 5 a section on the line 5—5 of Fig. 1; Fig. 6 a side elevation of one of the hooks; Fig. 7 a rear edge elevation of the same; Fig. 8 a plan of the hook-lever; and Fig. 9 a vertical section on the line 9—9 of Fig. 2.

The same letters of reference denote the same parts.

The lifter comprises a shovel-like part A, one or more hook-shaped parts B, B', and their respective operating levers C, C', and springs, D, D'. The shovel has a base or blade $a$, and one or more handles $a'$, $a^2$. The handles extend from the blade first upward, substantially as represented at $a^3$, and then horizontally substantially as shown. The blade is adapted to support the pan from beneath, and the upright portions $a^3$, $a^3$, of the handles may serve as a side support therefor, but they more especially serve as holders for the vertically-adjustable parts B, B', that may be styled hooks as they are suitably shaped to catch, when lowered, upon the side of the pan and confine it laterally. The handle-parts $a^3$ are each perforated vertically at $a^4$, and $a^5$, or in any equivalent manner constructed, to hold the hooks and guide them as they are raised and lowered. The hook B is operated by means of the lever C, and the hook B', by the lever C'. The levers are supported in the handles respectively, being pivoted at $c$ therein, and each lever being adapted to engage with its hook by passing its inner end $c'$ through a perforation $b$ in the hook. When the outer end, $c^2$, of the lever is lifted the hook is depressed and when the outer end of the lever is depressed the hook is lifted. The springs D, D', with which the handles are respectively provided are desirable as they insure or facilitate the depression of the outer end of the lever, and the lifting of the hook, when the lever is released. The handle-parts $a^3$ are shaped out at $a^6$ to provide for the movement of the lever in raising and lowering the hook.

Owing to the described action of the springs the hooks remain uplifted saving when they are intentionally depressed, and in operating the device the blade of the lifter is inserted beneath the pan (indicated by the broken lines E), and then the levers at the outer end thereof are closed against their respective handles and the hooks in consequence are thereby depressed to cause their points $b'$ to catch upon the side $e$ of the pan as indicated by the broken lines in Fig. 1. The lifter has now a firm hold upon the pan that can be moved as desired. I desire not to be restricted to any particular number of hooks and levers as one or more may be employed as preferred. The springs for moving the hook levers are not essential but are desirable. As the hooks when properly depressed lap upon the inside of the side of the pan it is possible to utilize them without necessarily using the levers. I however prefer to employ the entire combination of parts as shown.

I claim—

1. The combination of the shovel having the blade and handle parts, as described, the latter also constructed to form guides for the hooks, the hooks movable in said guides by means of levers, and the hook levers, substantially as set forth.

2. The combination of the shovel having the blade and handles, as described, the hooks vertically movable in guides in said handles by means of levers, the hook levers, and springs, substantially as set forth.

3. The combination of the shovel having the blade and handles, as described, and the hooks vertically movable in guides by means of levers, substantially as set forth.

4. In a pan lifter, the combination of the blade, a handle extended vertically and horizontally, as described, a hook vertically movable in guides in the handle, and a lever for operating said hook, substantially as described.

Witness my hand this 6th day of January, 1894.

WILLIAM REISSE.

Witnesses:
C. D. MOODY,
A. BONVILLE.